(12) United States Patent
Baehrle-Miller

(10) Patent No.: US 11,014,519 B2
(45) Date of Patent: May 25, 2021

(54) METHOD FOR TRIGGERING AN OCCUPANT PROTECTION DEVICE IN A VEHICLE

(71) Applicant: Robert Bosch GmbH, Stuttgart (DE)

(72) Inventor: Frank Baehrle-Miller, Schoenaich (DE)

(73) Assignee: Robert Bosch GmbH, Stuttgart (DE)

( * ) Notice: Subject to any disclaimer, the term of this patent is extended or adjusted under 35 U.S.C. 154(b) by 32 days.

(21) Appl. No.: 16/415,399

(22) Filed: May 17, 2019

(65) Prior Publication Data

US 2020/0001810 A1    Jan. 2, 2020

(30) Foreign Application Priority Data

Jun. 29, 2018   (DE) ................. 10 2018 210 794.7

(51) Int. Cl.
*B60R 21/0132* (2006.01)
*B60R 22/46* (2006.01)
*B60R 21/013* (2006.01)
*B60R 21/01* (2006.01)

(52) U.S. Cl.
CPC .......... *B60R 21/0132* (2013.01); *B60R 22/46* (2013.01); *B60R 2021/01013* (2013.01); *B60R 2021/01272* (2013.01); *B60R 2021/01311* (2013.01)

(58) Field of Classification Search
CPC ............... B60R 21/0132; B60R 22/46; B60R 2021/01311; B60R 2021/01272; B60R 2021/01013; B60R 21/0134; B60R 2022/4685; F16D 65/183; F16D 2121/24; F16D 2121/04; F16D 55/226; B60T 13/662; B60T 13/741; B60T 7/12; B60T 13/745

See application file for complete search history.

(56) References Cited

U.S. PATENT DOCUMENTS

| | | | | |
|---|---|---|---|---|
| 4,610,480 A | * | 9/1986 | Yamada | B60R 22/26 242/379.2 |
| 8,448,756 B2 | * | 5/2013 | Knechtges | B60T 13/746 188/72.8 |
| 2001/0029418 A1 | * | 10/2001 | Minowa | B60W 10/06 701/70 |
| 2004/0195030 A1 | * | 10/2004 | Eberle | B60R 21/013 180/271 |
| 2006/0097504 A1 | * | 5/2006 | Akaba | B60R 21/01546 280/806 |
| 2010/0231024 A1 | | 9/2010 | Davis et al. | |
| 2016/0355171 A1 | * | 12/2016 | Mannherz | B60T 7/12 |
| 2017/0369046 A1 | * | 12/2017 | Trappe | B60T 8/171 |
| 2018/0339675 A1 | * | 11/2018 | Jenny | B60R 21/0132 |
| 2019/0001941 A1 | * | 1/2019 | Westlund | B60T 8/1701 |

(Continued)

FOREIGN PATENT DOCUMENTS

DE    10 2012 025 269 A1    8/2013

*Primary Examiner* — Darlene P Condra

(74) *Attorney, Agent, or Firm* — Maginot, Moore & Beck LLP

(57) ABSTRACT

The disclosure relates to a method for triggering an occupant protection device in a vehicle with a parking brake, wherein for the case in which a deceleration of the vehicle is demanded by operating the parking brake while travelling, the occupant protection device is triggered automatically and displaced from an initial position into a protective position.

14 Claims, 4 Drawing Sheets

(56) References Cited

U.S. PATENT DOCUMENTS

2019/0135255 A1* 5/2019 Baehrle-Miller ..... B60T 13/741
2019/0202426 A1* 7/2019 Baehrle-Miller ..... B60T 13/588
2019/0283720 A1* 9/2019 Nijakowski ............... B60T 7/12

* cited by examiner

METHOD FOR TRIGGERING AN OCCUPANT PROTECTION DEVICE IN A VEHICLE

This application claims priority under 35 U.S.C. § 119 to application no. DE 10 2018 210 794.7, filed on Jun. 29, 2018 in Germany, the disclosure of which is incorporated herein by reference in its entirety.

TECHNICAL FIELD

The disclosure concerns a method for triggering an occupant protection device in a vehicle that is equipped with a parking brake.

BACKGROUND

DE 10 2012 025 269 A1 discloses a method for restraining an occupant of a vehicle, wherein an impending collision is detected and a belt tightening system for tightening the occupant's safety belt is activated. By tightening the safety belt, the occupant is forced against the seat back, whereby the risk of injury is intended to be reduced.

The method is carried out when the vehicle is at a standstill, which is determined using an activated parking brake.

US 2010/0231024 A1 discloses a belt system in a vehicle with a closing device that is automatically transferred into the closing position in the presence of a triggering condition. The closing position is for example activated in the event of actuation of the holding brake in the vehicle.

SUMMARY

The method according to the disclosure concerns the triggering of an occupant protection device in a vehicle equipped with a parking or holding brake, by means of which a braking force can be produced when the vehicle is at a standstill or when maneuvering, but also when travelling at a speed greater than the maneuvering speed.

If a deceleration is demanded by operating the parking brake while the vehicle is travelling, then the occupant protection device is automatically triggered and is automatically displaced from an initial position into a protective position. In the initial position the protective device exhibits an out of use or not in use function, whereas in the protective position the occupant protection device exhibits the protective effect thereof.

The safety of the occupants can be increased by the occupant protection device being automatically triggered in the presence of the conditions—driving the vehicle and operating the parking brake. The triggering of the occupant protection device is carried out automatically and thus without explicit action by the driver if the prerequisites necessary for this are met.

Actuation of the parking brake while the vehicle is travelling indicates an emergency situation or a hazardous situation, because the vehicle is usually decelerated while travelling by means of the hydraulic vehicle brake and not by means of the parking brake. If while travelling the parking brake is still actuated additionally or alternatively to the hydraulic vehicle brake and an acceleration demand is made by this means, an emergency or hazardous situation can be assumed, wherein the risk potential is reduced by activating the occupant protection device. When doing so it is not absolutely necessary that there is actually an emergency situation. The occupant protection device is activated or triggered as a precaution for the possible occurrence of an emergency situation. If the emergency situation actually occurs, the vehicle occupants are better protected because of the activation of the occupant protection device having already been carried out, especially in the case of an accident, so that the consequences of the accident for the vehicle occupant(s) can be significantly reduced.

Different types of occupant protection devices are considered. According to a preferred implementation the occupant protection device is a belt tightening system, the triggering of which causes the safety belt of at least one vehicle occupant, for example the driver, to be tightened. The vehicle occupant is pressed against the vehicle seat by the tightening of the safety belt, so that in the event of an accident, for example in the event of a collision of the vehicle with an obstacle or in the event of a rear-end collision by a third-party vehicle, the vehicle occupants are disposed with their backs in direct contact with the seat backs and with their heads in contact with the headrests and the risk of injuries, especially whiplash, is reduced.

A further advantage of the activation of the belt tightening is the haptic feedback to the vehicle occupant(s), who feel the tightening of the safety belt, so that the vehicle occupant(s) is/are aware that a protective function counteracting the consequences of the hazardous situation is activated.

Additionally or alternatively to the belt tightening system, other occupant protection devices can also be activated within the scope of the method according to the disclosure. This is for example automatic closing of the window panes, automatic closing of an open skylight in the vehicle roof, an audible or visual warning to the vehicle occupant(s) or similar. Additionally or alternatively, it may also be advantageous to activate or to vary a device in the vehicle that influences the vehicle dynamics as an occupant protection device, for example to change characteristic curves in an electronic stability program (ESP) towards a higher level of safety.

The holding or parking brake in the vehicle is preferably triggered manually in the context of the method according to the disclosure. In this case the driver manually activates the parking brake by means of a corresponding trigger mechanism of the parking brake, whereby the parking brake is activated and a vehicle deceleration is produced.

Additionally or alternatively to manual activation, automatic activation of the parking brake is also possible in the context of the method according to the disclosure. This case can for example occur in the event of a malfunction of the regular hydraulic vehicle brake, if for example it is determined that the desired braking force cannot be provided by means of the hydraulic vehicle brake. Thereupon the parking brake can be automatically activated additionally or alternatively to set a desired braking force and a desired vehicle deceleration. The automatic activation of the parking brake is carried out by means of actuation signals of a regulating or control unit in the vehicle, by which adjustable components of the parking brake and also the occupant protection device can be actuated. Both implementations with exactly one regulating or control unit for actuating the components of the parking brake and the occupant protection device and implementations with a regulating or control unit for each of the parking brake or occupant protection device are possible for actuating the respective adjustable components. In the case of two regulating or control units, said units communicate with each other, wherein the communications between the regulating or control units is carried out either directly via signal lines or via a vehicle bus system, for example a CAN bus.

According to a further advantageous implementation, the parking or holding brake is embodied as an electromechanical braking device with an electric brake motor that displaces a brake piston, which is the carrier of a brake lining, towards a brake disk in order to produce a braking force. Advantageously, the electromechanical braking device is integrated in a wheel brake device that is also part of the hydraulic vehicle brake. In this case, the brake piston is subjected to hydraulic brake pressure when the vehicle brake is actuated and is pressed against the brake disk. The hydraulic vehicle brake and the electromechanical braking device form a common brake system in the vehicle.

When the deceleration demand occurs, which is generated by actuating the parking brake, the electric brake motor is advantageously actuated in order to displace the brake piston towards the brake disk. Additionally or alternatively, when the parking brake is actuated it is also possible to activate a hydraulic actuator of the vehicle brake, by means of which the hydraulic brake pressure is increased, and the brake piston is applied against the brake disk by the brake pressure.

According to yet another advantageous implementation, the occupant protection device is only triggered for the case in which the speed of the vehicle exceeds a speed limit value.

The speed limit value can be specified as a fixed value, which can be for example 10 km/h, 20 km/h or 30 km/h. It can be advantageous that the speed limit value is greater than walking speed. If the speed of the vehicle is less than the speed limit value, automatic activation of the occupant protection device may be dispensed with. Setting a speed limit value also ensures that the occupant protection device is only triggered when the parking brake is activated while the vehicle is travelling, whereas when the vehicle is stationary or during a parking or maneuvering process at low speed with a maximum walking speed of for example 6 km/h the activation and triggering of the occupant protection device can be omitted, even if the parking brake is actuated manually or automatically.

According to yet another advantageous implementation, the occupant protection device is returned back to the initial position thereof after the ending of the actuation of the parking brake. In this case, it can be assumed therefrom that the emergency or hazardous situation does not last longer, so that it is also not necessary to continue to leave the occupant protection device in the protective position thereof.

Furthermore, the disclosure concerns a regulating or control unit for actuating the adjustable components of the parking brake and the occupant protection device for carrying out the method described above. The regulating or control unit may be part of a brake system in the vehicle. In the regulating or control unit, actuation signals for actuating the adjustable components of the parking brake and the occupant protection device are produced, wherein in the case of implementation of the parking brake as an electromechanical braking device the brake motor is actuated by the actuating signals of the regulating or control units. The hydraulic actuator in the vehicle brake may also be actuated by the actuating signals of the regulating or control unit. The same applies to the occupant protection device, wherein in the case of an implementation as a belt tightening system an actuator of the belt tightening system is actuated by the actuating signals.

The disclosure further concerns a vehicle with an occupant protection device and with a parking brake that is in particular embodied as an electromechanical braking device, and with a regulating or control unit that is described above for actuating the adjustable components of the parking brake and the occupant protection device and possibly also the further components of the vehicle brake.

The disclosure further concerns a computer program product with a program code that is designed to carry out the steps of the method that are described above. The computer program product runs in the regulating or control unit that is described above.

BRIEF DESCRIPTION OF THE DRAWINGS

Further advantages and advantageous implementations are to be found in the description of the figures and the drawings. In the figures.

DETAILED DESCRIPTION

Figure 1:
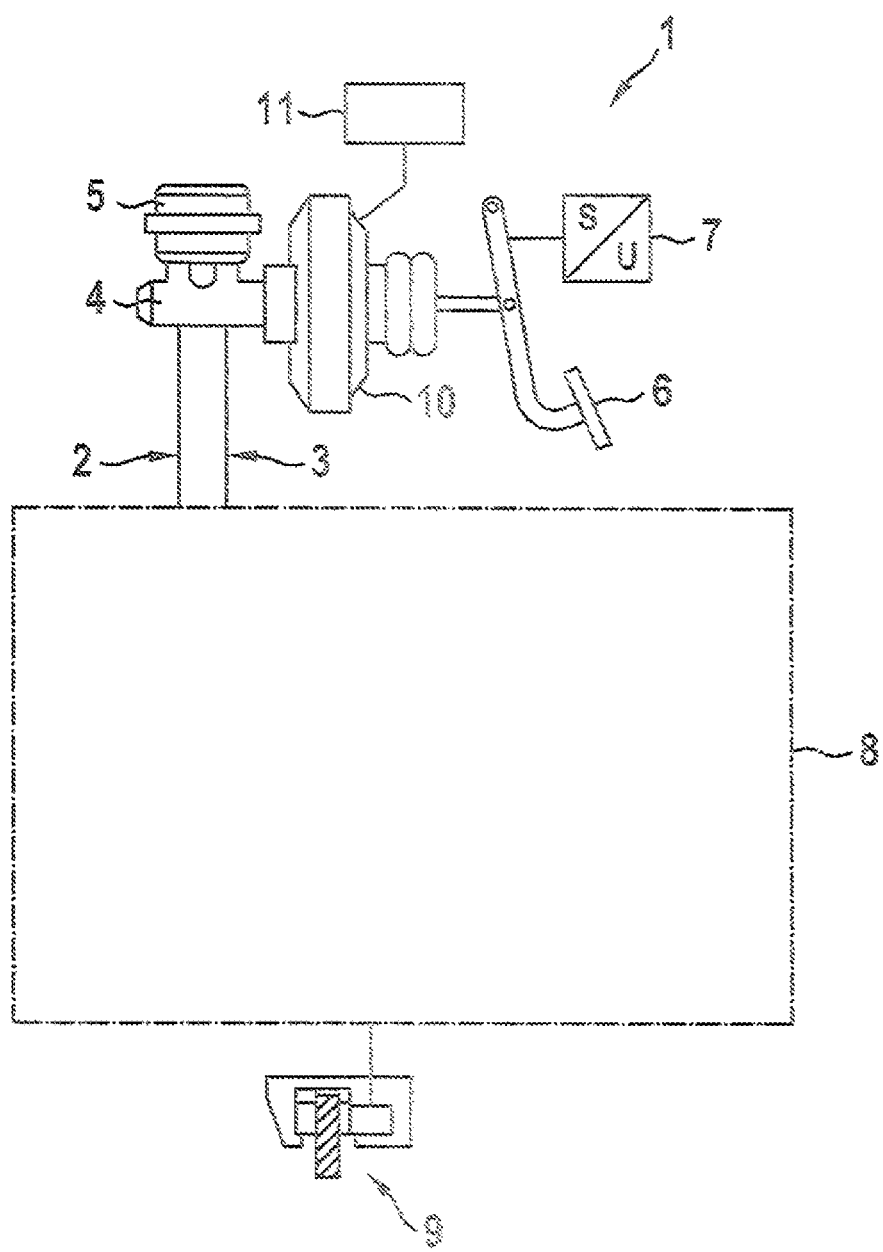
FIG. 1 shows a schematic representation of a hydraulic vehicle brake, wherein wheel brake devices of the vehicle brake are fitted with electromechanical braking devices, each with an electric brake motor.

In the figures identical components are provided with the same reference characters.

The brake system for a vehicle represented in FIG. 1 comprises a hydraulic dual circuit vehicle brake 1 with a first hydraulic brake circuit 2 and a second hydraulic brake circuit 3 for supplying and actuating wheel brake devices 9 on each wheel of the vehicle with a brake fluid under hydraulic pressure. The two brake circuits 2, 3 are connected to a common master brake cylinder 4 that is supplied with brake fluid by means of a brake fluid reservoir container 5. The master brake cylinder piston in the master brake cylinder 4 is actuated by the driver by means of the brake pedal 6, and the pedal travel caused by the driver is measured by means of a pedal travel sensor 7. Between the brake pedal 6 and the master brake cylinder 4 there is a brake force booster 10 that comprises for example an electric motor, which is preferably actuated by means of a gearbox of the master brake cylinder 4 (iBooster).

The hydraulic vehicle brake 1 can additionally or alternatively to the iBooster comprise an integrated electrohydraulic brake unit with an electromotively driven plunger. The vehicle brake 1 is advantageously embodied as a brake-by-wire system, wherein brake pedal actuation causes a displacement of hydraulic volume in a pedal travel simulator. The build-up of brake pressure is carried out according to the brake pedal actuation by means of electromotive actuation of the plunger. In the event of failure of the electrohydraulic brake unit, isolating valves that connect the brake circuit to the master brake cylinder 4 are opened, so that the driver has a direct hydraulic reach through to the wheel brake devices 9 when the brake pedal is operated.

The actuation movement of the brake pedal 6 measured by the pedal travel sensor 7 is transmitted as a sensor signal to a regulating or control unit 11 in which actuation signals for actuating the brake force booster 10 are produced. The supply of the wheel brake devices 9 with brake fluid is carried out in each brake circuit 2, 3 via different switching valves that are part of the brake hydraulics 8 in common with further assemblies. The brake hydraulics 8 further comprise a hydraulic pump that is a component of an electronic stability program (ESP).

The two hydraulic brake circuits 2 and 3 of the dual circuit vehicle brake 1 are for example partitioned diagonally, so that for example the first brake circuit 2 of the two wheel brake devices 9 on the left front wheel and on the right rear wheel and the second brake circuit 3 of the two wheel brake devices 9 on the right front wheel and on the left rear wheel are supplied with brake fluid. Alternatively, a division of the two hydraulic brake circuits 2 and 3 of the dual circuit vehicle brake 1 at the wheel brake devices on the front axle and the wheel brake devices on the rear axle is also possible.

Figure 2:
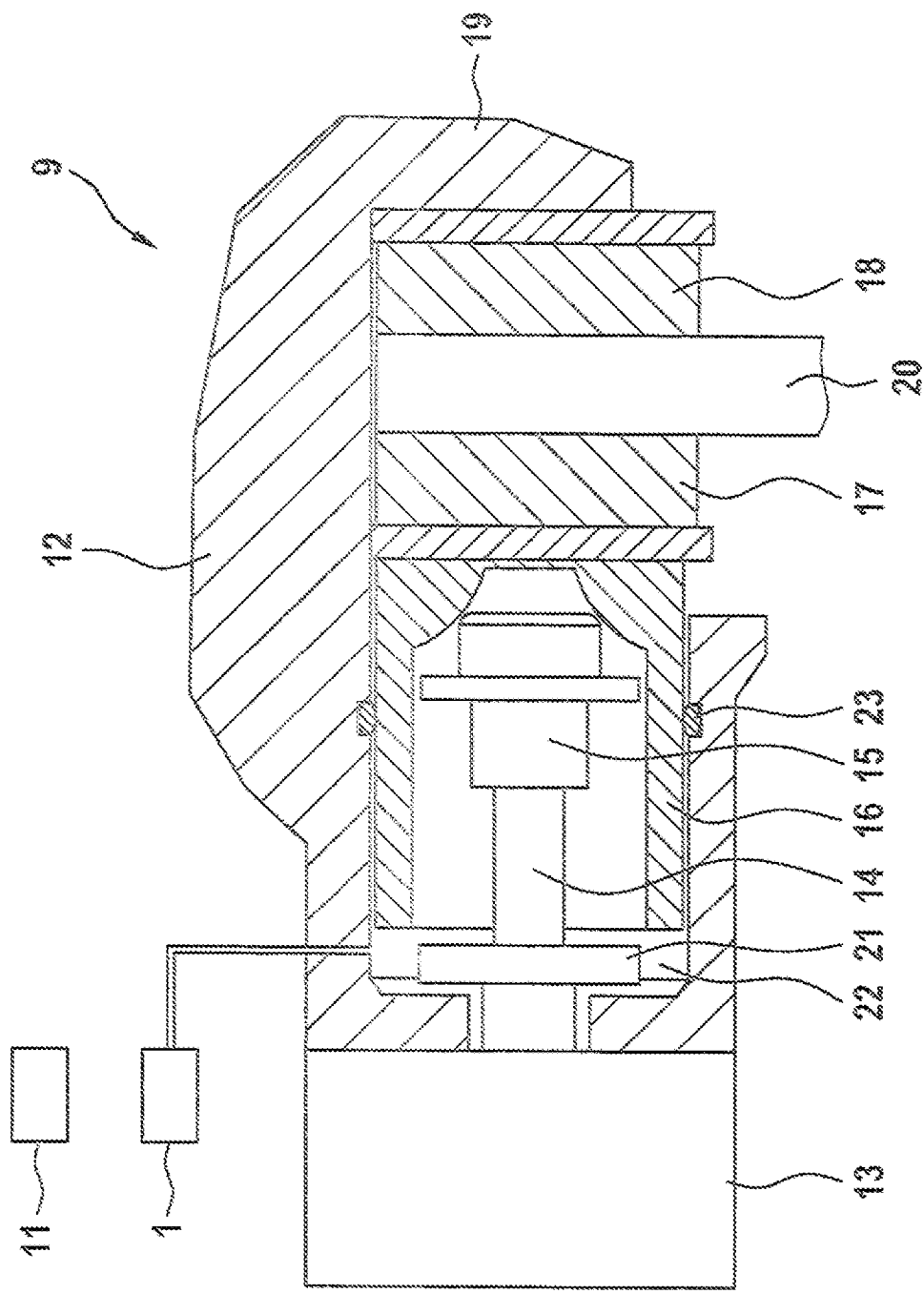
FIG. 2 shows a section through an electromechanical braking device with an electric brake motor.

In FIG. 2 the wheel brake device 9 disposed on a wheel on the rear axle of the vehicle is represented in detail. The wheel brake device 9 is part of the hydraulic vehicle brake 1 and is supplied with brake fluid 22 from a brake circuit 2, 3. The wheel brake device 9 further comprises an electromechanical braking device that can be used as a parking or holding brake for holding the vehicle at a standstill, but can also be used for decelerating when the vehicle is moving.

The electromechanical braking device comprises a brake caliper 12 with a claw 19 enclosing a brake disk 20. As an actuating element the braking device comprises a d.c. electric motor as a brake motor 13, the rotor shaft of which drives a spindle 14 rotationally, on which a spindle nut 15 is supported rotationally fixedly. During rotation of the spindle 14 the spindle nut 15 is displaced axially. The spindle nut 15 moves within a brake piston 16 that is the carrier of a brake lining 17 that is pressed against the brake disk 20 by the brake piston 16. On the opposite side of the brake disk 20 there is a further brake lining 18 that is mounted positionally fixedly on the claw 19. The brake piston 16 is sealed pressure-tight on the outside thereof relative to the accommodating housing by means of an enclosing sealing ring 23.

Within the brake piston 16 the spindle nut 15 can move axially forwards towards the brake disk 20 during rotation of the spindle 14 or can move axially rearwards until it reaches a stop 21 during an opposite rotation of the spindle 14. To produce a clamping force the spindle nut 15 acts on the inner end face of the brake piston 16, whereby the brake piston 16 that is axially movably supported in the braking device is pressed with the brake lining 17 against the facing end face of the brake disk 20.

For the hydraulic braking force, the hydraulic pressure of the brake fluid 22 from the hydraulic vehicle brake 1 acts on the brake piston 16. The hydraulic pressure can also act in support when the electromechanical braking device is actuated when the vehicle is at a standstill, so that the total braking force is composed of the electromotive component and the hydraulic component. While the vehicle is travelling, for carrying out a braking process either only the hydraulic vehicle brake is active, or both the hydraulic vehicle brake and the electromechanical braking device are active or only the electromechanical braking device is active in order to produce a braking force. The actuation signals for actuating both the adjustable components of the hydraulic vehicle brake 1 and the electromechanical wheel brake device 9 are produced in the regulating or control unit 11.

The wheel brake device 9 represented in FIG. 2, which is additionally equipped with the electromechanical braking device with the brake motor 13, is preferably disposed on the rear axle of the vehicle. The electric brake motors 13 in the two wheel brake devices 9 on the rear axle can be actuated mutually independently.

Figure 3:
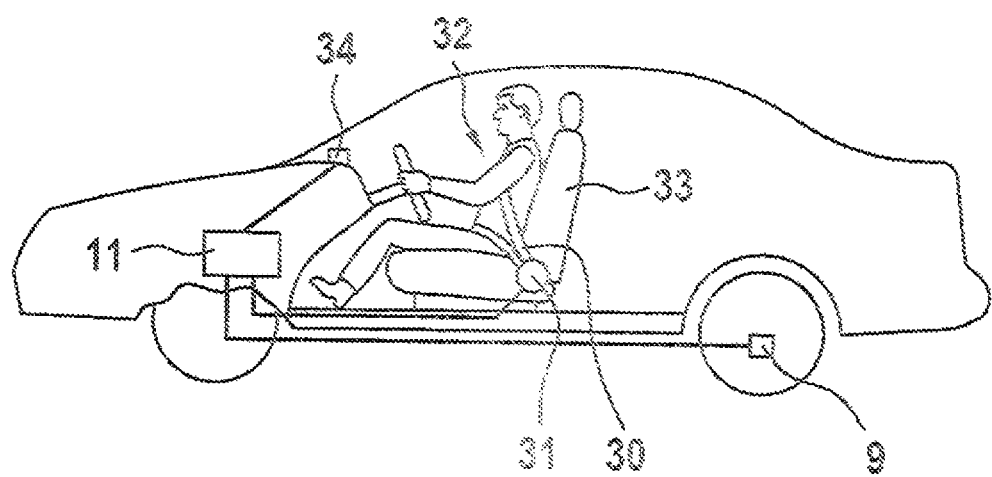
FIG. 3 shows a schematic representation of a vehicle with a belt tightening system and a parking brake.

FIG. 3 shows a schematic representation of a vehicle that is equipped in a known way with safety belts on the vehicle seats. In FIG. 3 a safety belt 30 is represented that is used to secure a vehicle occupant 32—the driver—to the vehicle seat. A belt tightening system 31 that is associated with the safety belt 30 forms an active occupant protection device that can be displaced between an inoperative initial position and a protective position. If the belt tightening system 31 is activated and thereby displaced from the initial position into the protective position, the belt tightening system 31 causes tightening of the safety belt 30, so that the driver 32 is pressed against the seat back 33. This enables injuries to be prevented or at least the severity of the injuries to be reduced, in particular in the event of a collision of the vehicle or an impact of another vehicle on the vehicle.

The belt tightening system 31 can also be displaced from the protective position back into the initial position again, in which the belt tightening system 31 does not exert any tightening force on the safety belt 30.

The belt tightening system 31 is connected by means of an electric line to the regulating or control unit 11 in the vehicle, by means of which the wheel brake devices 9 in the vehicle wheels are also actuated. By means of the connecting lines between the regulating or control unit 11 and the wheel brake devices 9 or the belt tightening system 31, respective actuation signals for actuating the relevant active units can be transmitted and advantageously signals can also be transmitted in the opposite direction that reflect the respective current state of the active unit. This implementation enables both the wheel brake devices 9 and the belt tightening system 31 to be actuated in the same regulating or control unit 11. During actuation of the wheel brake devices 9, which are both part of the electromechanical parking brake and part of the hydraulic vehicle brake, it is possible for the electric brake motor and/or a hydraulic actuator of the vehicle brake to be actuated in order to carry out a deceleration demand and generation of a braking force.

The brake force demand is carried out in the context of the method according to the disclosure by actuating the parking brake, which for example can be carried out manually by means of an actuating switch 34 of the parking brake by vehicle occupant(s) 32. If this is carried out while travelling, then the belt tightening system 31 is also actuated at the same time as the generation of a braking force and is transferred from the initial position into the protective position.

Figure 4:
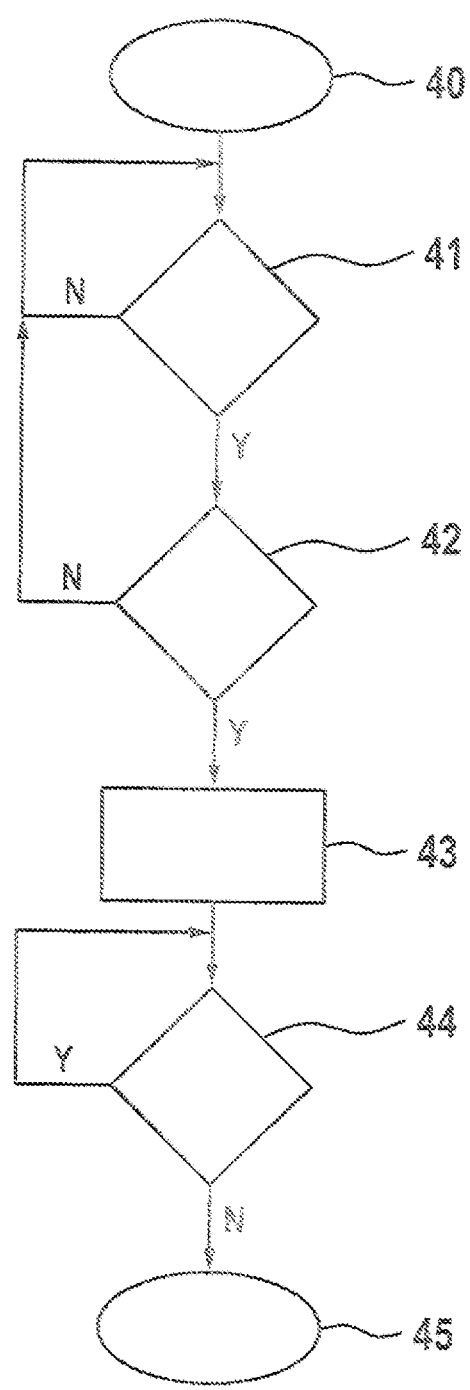
FIG. 4 shows a flow chart with steps of the method for triggering the belt tightening system when the parking brake is actuated while travelling.

In FIG. 4 an example of a flow chart with steps of the method for triggering the belt tightening system when the parking brake is actuated while travelling is represented.

After the start of the method in the first step of the method 40, in the following step 41 of the method the query is carried out as to whether a vehicle speed exceeds a speed limit value, which is in particular greater than walking speed and for example lies at a value of at least 10 km/h. This ensures that the activation of the belt tightening system is not carried out when the vehicle is stationary or during a parking or unparking process.

If the result of the query in step 41 is that the speed of the vehicle is not greater than the speed limit value, the no branch ("N") is consequently returned back to the start of step 41 of the method, whereupon the query is carried out again at regular intervals according to step 41.

If on the other hand the result of the query in step 41 is that the speed of the vehicle is greater than the speed limit value, the yes branch ("Y") is consequently advanced to the next step 42, in which a further query is carried out. According to step 42 the query is carried out as to whether the parking brake has been manually operated by the driver in order to demand a vehicle deceleration. If this is not the case, the no branch is returned to the start of step 41 of the method. Otherwise there is actually a deceleration demand by manual operation of the parking brake, and the yes branch is consequently advanced to the next step 43 of the method.

In step 43 of the method the belt tightening system is activated and thus displaced from the initial position into the protective position, in which a force is exerted on the safety belt and the vehicle occupant is pressed against the seat back of his seat. In the following step 44 the query is carried out as to whether the parking brake is still active at regular intervals. If this is the case, the yes branch is consequently returned to the start of step 44 of the method and the query in step 44 is carried out again at regular intervals. As long as the parking brake is still active, the belt tightening system also remains activated.

If by contrast the result of the query in step 44 is that the parking brake is no longer active, i.e. the driver is no longer operating the parking brake actuation, the no branch is consequently returned to step 45, in which the belt tightening system 31 is deactivated and thus returned from the protective position into the initial position. Thereupon the method is ended.

Alternatively, in step 44 a query can be carried out as to whether the vehicle is at a standstill and the standstill has lasted for a minimum period of time. If this is the case, the belt tightening system 31 can be deactivated and the method is ended.

According to yet another alternative, in step 44 a query can be made as to whether the parking brake is activated while the vehicle is at a standstill, so that the vehicle is held at a standstill. If this is the case, the belt tightening system 31 can be deactivated and the method is ended.

What is claimed is:

1. A method for triggering an occupant protection device in a vehicle having a parking brake, the method comprising:
   automatically triggering the occupant protection device and displacing the occupant protection device from an initial position into a protective position, in response to a deceleration of the vehicle being demanded by actuating the parking brake while travelling.

2. The method according to claim 1, wherein the occupant protection device is a belt tightening system and the triggering the occupant protection device further comprises:
   tightening a safety belt for at least one vehicle occupant.

3. The method according to claim 1, wherein the parking brake is an electromechanical braking device in the vehicle and has an electric brake motor configured to displace a brake piston towards a brake disk when the deceleration of the vehicle is demanded.

4. The method according to claim 3, wherein the brake piston is part of a wheel brake device of a hydraulic vehicle brake and is configured to be displaced by a hydraulic brake pressure that is produced by a hydraulic actuator of the hydraulic vehicle brake when the deceleration of the vehicle is demanded.

5. The method according to claim 3 further comprising:
   displacing the brake piston with the electric brake motor in response to the deceleration of the vehicle being demanded.

6. The method according to claim 1, the triggering the occupant protection device further comprising:
   the triggering the occupant protection device only if a speed of the vehicle exceeds a speed limit value.

7. The method according to claim 1 further comprising:
   manually triggering the parking brake to decelerate the vehicle.

8. The method according to claim 1 further comprising automatically triggering the parking brake to decelerate the vehicle in response to detecting an emergency situation.

9. The method according to claim 8, wherein the emergency situation is one of a failure and a partial failure of a hydraulic vehicle brake of the vehicle.

10. The method according to claim 1 further comprising:
    returning the occupant protection device to the initial position from the protection position in response to an ending of the actuating the parking brake.

11. A controller configured to trigger an occupant protection device in a vehicle and actuate adjustable components of a parking brake of the vehicle that is actuated independent of a brake pedal of the vehicle, the controller configured to:
    automatically trigger the occupant protection device and displace the occupant protection device from an initial position into a protective position, in response to a deceleration of the vehicle being demanded by actuating the parking brake while travelling.

12. The controller according to claim 11, wherein the controller executes program code stored on a non-transitory computer program product to trigger the occupant protection device and actuate the adjustable components of the parking brake.

13. A vehicle comprising:
    an occupant protection device;
    a brake pedal configured to operate a vehicle braking system;
    a parking brake that is actuated independent of the brake pedal of the vehicle; and
    a controller configured to trigger the occupant protection device and actuate adjustable components of the parking brake, the controller configured to:
    automatically trigger the occupant protection device and displace the occupant protection device from an initial position into a protective position, in response to a deceleration of the vehicle being demanded by actuating the parking brake while travelling.

14. The vehicle according to claim 13, wherein the parking brake is embodied as an electromechanical braking device.

* * * * *